US006983363B2

(12) United States Patent
Coffey

(10) Patent No.: US 6,983,363 B2
(45) Date of Patent: Jan. 3, 2006

(54) RESET FACILITY FOR REDUNDANT PROCESSOR USING A FIBER CHANNEL LOOP

(75) Inventor: Aedan Diarmuid Cailean Coffey, Kilkenny (IE)

(73) Assignee: Richmount Computers Limited, Dublin (IE)

( * ) Notice: Subject to any disclaimer, the term of this patent is extended or adjusted under 35 U.S.C. 154(b) by 612 days.

(21) Appl. No.: 10/091,647

(22) Filed: Mar. 5, 2002

(65) Prior Publication Data

US 2002/0129232 A1 Sep. 12, 2002

(30) Foreign Application Priority Data

Mar. 8, 2001 (IE) ............................... S2001/0223
Jun. 27, 2001 (IE) ............................... S2001/0610

(51) Int. Cl.
G06F 9/24 (2006.01)
G06F 15/177 (2006.01)
G06F 13/00 (2006.01)
G06F 11/00 (2006.01)

(52) U.S. Cl. ............................. 713/1; 713/2; 709/220; 710/104; 714/3

(58) Field of Classification Search ............... 713/1, 713/2; 709/224
See application file for complete search history.

(56) References Cited

U.S. PATENT DOCUMENTS

| | | | |
|---|---|---|---|
| 5,136,715 A * | 8/1992 | Hirose et al. ................... 713/2 |
| 5,183,749 A | 2/1993 | Ramos et al. | |
| 5,313,369 A | 5/1994 | Lewis et al. | |
| 5,483,423 A | 1/1996 | Lewis et al. | |
| 5,790,782 A | 8/1998 | Martinez et al. | |
| 5,814,762 A | 9/1998 | Tusler et al. | |
| 5,892,954 A * | 4/1999 | Tomas et al. ................ 710/200 |
| 5,892,973 A | 4/1999 | Martinez et al. | |
| 5,933,824 A * | 8/1999 | DeKoning et al. .............. 707/8 |
| 5,956,665 A | 9/1999 | Martinez et al. | |
| 6,000,020 A * | 12/1999 | Chin et al. ................... 711/162 |
| 6,044,367 A * | 3/2000 | Wolff ............................ 707/2 |
| 6,050,658 A | 4/2000 | O'Sullivan et al. | |
| 6,061,244 A | 5/2000 | O'Sullivan et al. | |
| 6,115,814 A | 9/2000 | Lieber et al. | |
| 6,188,973 B1 | 2/2001 | Martinez et al. | |
| 6,269,288 B1 * | 7/2001 | Smith ......................... 700/295 |
| 6,314,488 B1 * | 11/2001 | Smith ......................... 710/240 |
| 6,330,690 B1 * | 12/2001 | Nouri et al. .................. 714/23 |
| 6,658,504 B1 | 12/2003 | Lieber et al. | |
| 2002/0004342 A1 | 1/2002 | Mullins et al. | |
| 2002/0008427 A1 | 1/2002 | Mullins et al. | |
| 2002/0010883 A1 | 1/2002 | Coffey et al. | |
| 2002/0043877 A1 | 4/2002 | Mullins et al. | |
| 2002/0044561 A1 | 4/2002 | Coffey | |
| 2002/0044562 A1 | 4/2002 | Killen, Jr. et al. | |
| 2002/0046276 A1 | 4/2002 | Coffey et al. | |
| 2002/0054477 A1 | 5/2002 | Coffey et al. | |
| 2002/0129182 A1 | 9/2002 | Coffey | |
| 2002/0159311 A1 | 10/2002 | Coffey et al. | |
| 2003/0056048 A1 | 3/2003 | Mullins et al. | |

* cited by examiner

*Primary Examiner*—Lynne H. Browne
*Assistant Examiner*—Stefan Stoynov
(74) *Attorney, Agent, or Firm*—Oppedahl & Larson LLP

(57) ABSTRACT

A processor resetting apparatus comprises a fibre channel arbitrated loop (FC-AL) interface arranged to receive a frame over the FC-AL containing an indicator of a reset command for a server comprising one of a redundant pair of servers and including a processor associated with the resetting apparatus. The apparatus further comprises a reset component, responsive to the reset command, to issue a reset command for resetting the processor. The apparatus therefore provides the ability for a server to reset another server if it detects that the server is faulty.

2 Claims, 6 Drawing Sheets

RESET FACILITY FOR REDUNDANT PROCESSOR USING A FIBER CHANNEL LOOP

FIELD OF THE INVENTION

The present invention relates to an apparatus and a method for resetting a processor via a fibre channel arbitrated loop (FC-AL).

RELATED APPLICATIONS

The invention herein disclosed is related to co-pending application no. S2001/0224 filed on Mar. 8, 2001 entitled "Distributed Lock Management Chip" naming Aedan Diarmid Cailean Coffey as inventor

BACKGROUND OF THE INVENTION

Growth in data-intensive applications such as e-business and multimedia systems has increased the demand for shared and highly available data. A Storage Area Network (SAN) is a switched network developed to deal with such demands and to provide scalable growth and system performance. A SAN typically comprises servers and storage devices connected via peripheral channels such as Fibre Channel (FC) and Small Computer Systems Interface (SCSI), providing fast and reliable access to data amongst the connected devices. FIG. 1 shows a simple example of a SAN (10) comprising two servers (Server A (20) and Server B (30)) connected by a FC-AL (40) to a series of disks (50) configured as a redundant array of independent disks (RAID). The SAN (10) is in turn connected through Server A (20) and Server B (30) to a series of client workstations (60) via a network (70) (e.g. Ethernet/Internet). Server A (20) and Server B (30) are themselves in further communication through a private connection (80) which is not accessible by the client workstations (60) and whose purpose is to facilitate server resetting.

Referring now to FIG. 2 where the components of Server B 30 relevant to the present specification are shown in more detail. The server includes a PCI Bus 230 via which the main components of the server intercommunicate. A CPU 180 communicates with the PCI Bus 230 via a North Bridge controller 200 which also provides access for the CPU to system memory 190 and the PCI Bus. A fibre channel interface chip 220, decodes incoming fibre channel information and communicates this across the PCI bus, for example, by using direct memory access (DMA) to write information into system memory 190 via the North Bridge 200. Similarly, information is written to the chip 220 for encoding and transmission across the fibre channel 40. A network adaptor 160 allows the CPU to process requests received from clients 60 across the network 70, perhaps requiring the CPU 180 in turn to make fibre channel requests for data stored on the disks 50. In the present example, the server includes a dedicated reset controller and watchdog circuit 300, for example, Dallas Semiconductor DS705. On the one hand, the reset controller 300 monitors the state of the CPU and if it decides the CPU has hung, it will automatically reset the entire server by asserting a system-reset signal, which is in turn connected to most of the major components of the server. Alternatively, the CPU 180 or, for example, a signal that is asserted by another server on the private connection 80 could be used to actively reset the server by instructing the reset controller to assert the system-reset signal.

Whilst a SAN with large amounts of cache and redundant power supplies ensures that data stored in the network is protected at all times, user-access to the data can be disabled if a server fails. In a SAN context, server clustering is a process whereby servers are grouped together to share data from the storage devices, and wherein each server is available to client workstations. Since various servers have access to a common pool of data, the workstations have a choice of servers through which to access that data. This has the advantage of increasing the fault tolerance of the SAN by providing alternative routes to stored data should a server fail, thereby maintaining uninterrupted data and application availability.

Clusters may be classified as being failover or load-balancing. In a failover cluster a given server may be a hot-spare (or hot-standby) which behaves as a purely passive node in the cluster and only activates when another server fails. Servers in load-balancing clusters may be active at all times in the cluster. Such clusters can produce significant performance gains through the distribution of computational tasks between the servers.

Any highly available or failover cluster with multiple servers requires a method of forcing a malfunctioning server off the system, to prevent it disrupting normal SAN operation. This facility is conventionally provided by a feature known as STOMITH (Shoot the Other Machine in the Head).

Faulty server operation can be detected through heartbeat monitoring by hardware or software watchdog type systems on individual servers. In this process, the FC-AL (or otherwise) connected servers each issue signals (or heartbeats) onto the FC-AL at regular intervals. The connected servers each have at least one watchdog whose purpose it is to detect the heartbeats of the other servers. When the heartbeat of a given server is detected by the watchdogs of the other connected servers, it indicates to such servers that the issuing server is functioning correctly. If however, the watchdogs fail to detect the heartbeat of a given server after a prescribed period (the watchdog timeout), the servers check that the FC-AL connections are functioning correctly. Further failed attempts to communicate indicate to the other connected servers that the issuing server is hung. In such circumstances, the private interconnection (80) between the servers enables one of the connected servers to reset or power down the hung server.

It is acknowledged that in the case of a high level watchdog operating over the FC-AL, no additional cabling is required. However, for low level watchdogs with STOMITH capability, private interconnections with dedicated cabling are required, making it difficult to easily expand the SAN beyond a dedicated backplane. Such dedicated wiring requires extra PWB traces and extra cabling between processors, which is both expensive and contributes to system unreliability by providing another potential failure point. Further, since the private interconnections are generally not FC connections themselves, they do not allow servers so interconnected to be separated by the same distances as would be achievable with FC connections (in FC it is possible to have devices separated by up to 30 km) thereby eliminating one of the advantages of using an FC-AL to connect the SAN.

Where the private connection 80 of FIG. 2 is not available, an alternative approach to the problem of resetting hung servers which avoids the necessity of private interconnections described earlier, is to use the FC-AL connections themselves to deliver reset instructions between servers.

In the case of FIG. 2, the servers on the FC-AL (40) are known to co-operate in a "buddy system" wherein at system initialisation each server is twinned with another so that each server has only one buddy and is itself a buddy to that server. Each buddy uses heartbeat monitoring on the FC-AL (40) to assess the status of its buddy.

However, whilst heart-beat monitoring on the FC-AL (40) of the connected buddies enables a server to detect if its buddy has hung, the normal FC protocol and FC-AL topology do not enable a server to reset a hung buddy. For instance in FIG. 2, without the connection 80, there is no way in which Server A (20) can access the reset controller and watchdog (300) of Server B (30) to reset Server B (30) if needed. Consequently, if Server A (20) detects that Server B (30) is malfunctioning, it can only send a message to Server B (30) alerting it of its hung state and advising Server B (30) to take the appropriate remedial action. However, if Server B (30) is so badly hung, that it cannot alleviate its own situation, then Server B (30) will remain hung, because Server A (20) cannot reset it.

SUMMARY OF THE INVENTION

According to the invention there is a provided a processor resetting apparatus comprising:
a fibre channel arbitrated loop (FC-AL) interface arranged to receive a frame containing an indicator of a reset command for a server including a processor associated with said resetting apparatus; and
reset means, responsive to said reset command, to issue a reset command for resetting said processor.

Preferably, the server is one of a redundant pair of servers.

Preferably, the apparatus may be a separate component of a server motherboard or may be integrated within the server motherboard.

The invention provides the ability for a server to reset another server if it detects that the server is faulty.

The invention allows the building of a high availability, scaleable file server that does not require additional inter-processor wiring for server resetting.

The invention could be used in a high availability version of any redundant processing system using fibre channel as a communications medium.

The invention could allow high availability server systems to be offered using existing backplanes and cabling systems.

Since all communications for server reset are conducted over a FC-AL, the system can take advantage of the benefits of FC communications and provide a system that is scalable beyond a shelf even into two separate geographical locations.

BRIEF DESCRIPTION OF THE DRAWINGS

Embodiments of the invention will now be described with reference to the accompanying drawings, in which.

DETAILED DESCRIPTION OF THE PREFERRED EMBODIMENT

Figure 1:
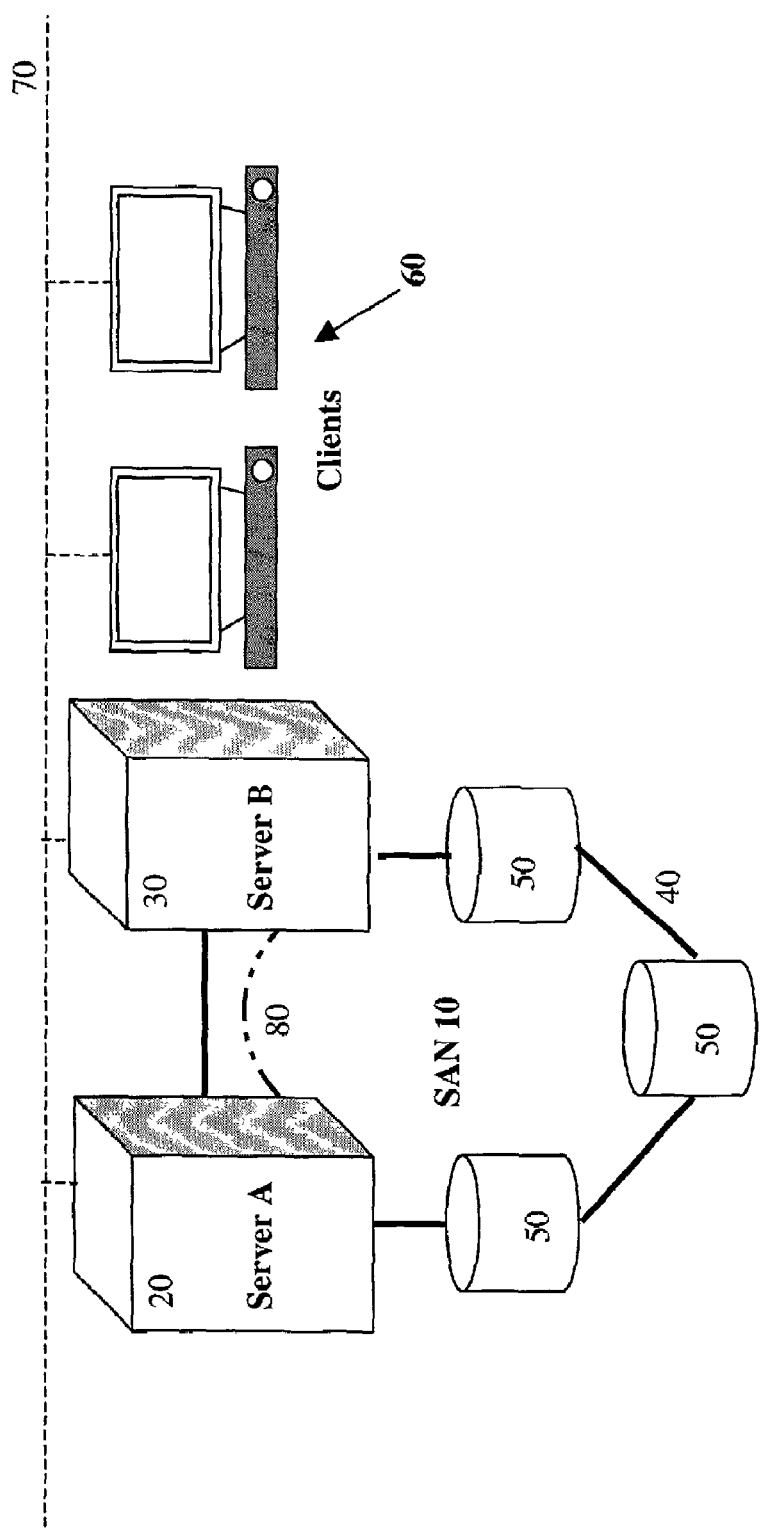
FIG. 1 shows a conventional SAN with private interconnections between its servers.
Figure 2:
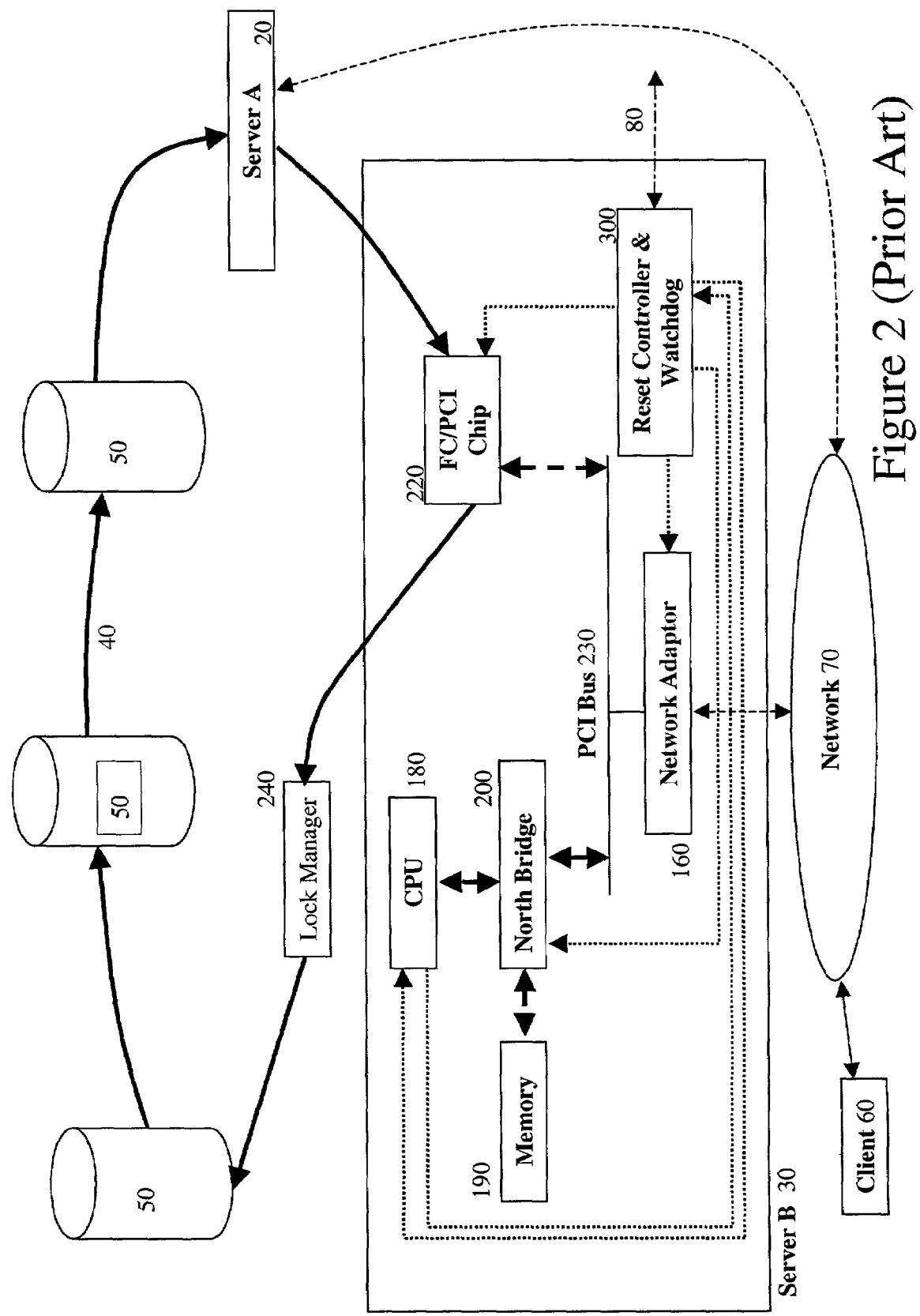
FIG. 2 shows another conventional SAN in which lock management is provided through a central lock manager 240.
Figure 3:
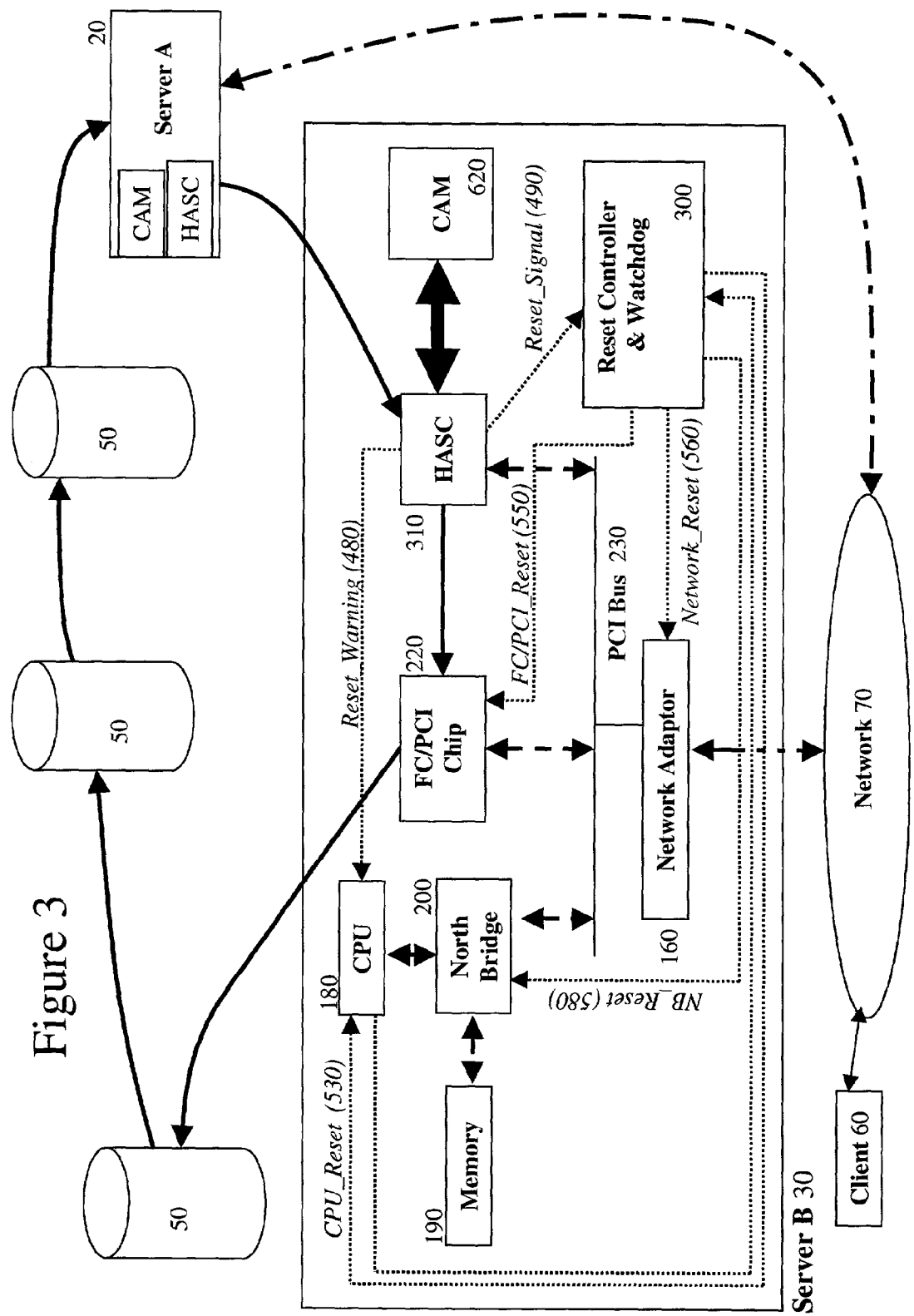
FIG. 3 is a block diagram providing a broad overview of the hardware components of a SAN in which each server has an associated support device (HASC) according to a preferred embodiment of the invention to facilitate server resetting and lock management.

FIG. 3 is a block diagram providing a broad overview of the hardware components of a FC-AL SAN where components with the same numerals as in FIG. 2 perform corresponding functions. The SAN comprises one or more storage shelves holdings disks 50 and a plurality of highly available servers (only two 20, 30 shown). The servers may dedicated PCB format devices housed within a shelf. Such servers could typically include inter alia external expansion ports for extending the fibre channel 40 from shelf to shelf and also an external network connector allowing the server to plug into the network 70. Alternatively, the servers may be stand-alone general-purpose computers.

In any case, each server 20, 30 has an associated support device (310) referred to in the description as a HASC (high availability support chip). For a dedicated server, the HASC could be implemented as a chip which plugs into a socket on the server PCB, whereas for a general-purpose server, the HASC could reside on its own card, plugging-into the server system motherboard.

In any case, at system initialisation each high availability server twins with a buddy. If dedicated servers are used, twinned servers should preferably not be located in the same shelf (for added reliability). During normal operation the highly available servers load share and if a server loses its buddy it can buddy up with a spare if available. In the preferred embodiment there may be a requirement for more high availability processors than provided for by the natural limit of such systems. For some systems, approximately 8 shelves would produce a limit of 16 high availability servers. (In other conventional systems, the servers would be in one rack and the storage in either the same rack or another one.) In any case, there are four alternatives to adding processors:
(i) Add extra shelves with no drives;
(ii) Re-package the high-availability server into a format using SCA (Single Connector Attachment) connectors, so that it can be loaded from the front of a backplane, instead of one or more disks;
(iii) Design a custom backplane, capable of taking lots of high-availability servers, in a front loadable format; or
(iv) Design metalwork capable of holding high-availability servers.

In any case, a server's HASC (310) is provided with a FC interface comprising a pair of ports that enable it to connect to the FC-AL (40) and so communicate with any server's via their associated FC/PCI chip (220). The HASC (310) also includes a PCI interface enabling communication with its associated server's CPU (180) through the server's PCI bus (230).

The HASC is further provided with connections to an associated Content Addressable Memory (CAM) (620). On providing the CAM with the data for which it is required that a search be done, the CAM will search itself for the data and if the CAM contains a copy of that data, the CAM will return the address of the data therein. In this embodiment, the HASC allows the CAM to be read and written by the local CPU (180) via the PCI Bus 230 or by any other device on the FC-AL (40), via the FC interface. It will be seen that because, the HASC (310) is ultimately a totally hardware component it permits fast searching of the CAM. (It will nonetheless be seen that the HASC can be designed using software packages, which store the chip design in VHDL format prior to fabrication.)

In the preferred embodiment, the HASC (310) is shown as a separate board from that of the server (30), with its own Arbitrated Loop Physical Addresses (ALPA). However, it should be recognised that the HASC (310) could be incorporated into the server wherein both components would share the same FC-AL interface (220) and ALPA, such incorporation producing the beneficial effect of reducing the latency caused by the provision of HASC support services.

In this example, data from Server A (20) is transmitted through the FC-AL (40) to Server B (30). Before it is transmitted on an FC-AL, every byte of data is encoded into a 10 bit string known as a transmission character (using an 8B/10B encoding technique (U.S. Pat. No. 4,486,739)). Each un-encoded byte is accompanied by a control variable of value D or K, designating the status of the rest of the bytes in the transmission character as that of a data character or a special character respectively. In general, the purpose of this encoding process is to ensure that there are sufficient transitions in the serial bit-stream to make clock recovery possible.

All information in FC is transmitted in groups of four transmission characters called transmission words (40 bits). Some transmission words have a K28.5 transmission character as their first transmission character and are called ordered sets. Ordered sets provide a synchronisation facility which complements the synchronisation facility provided by the 8B/10B encoding technique.

Figure 4:
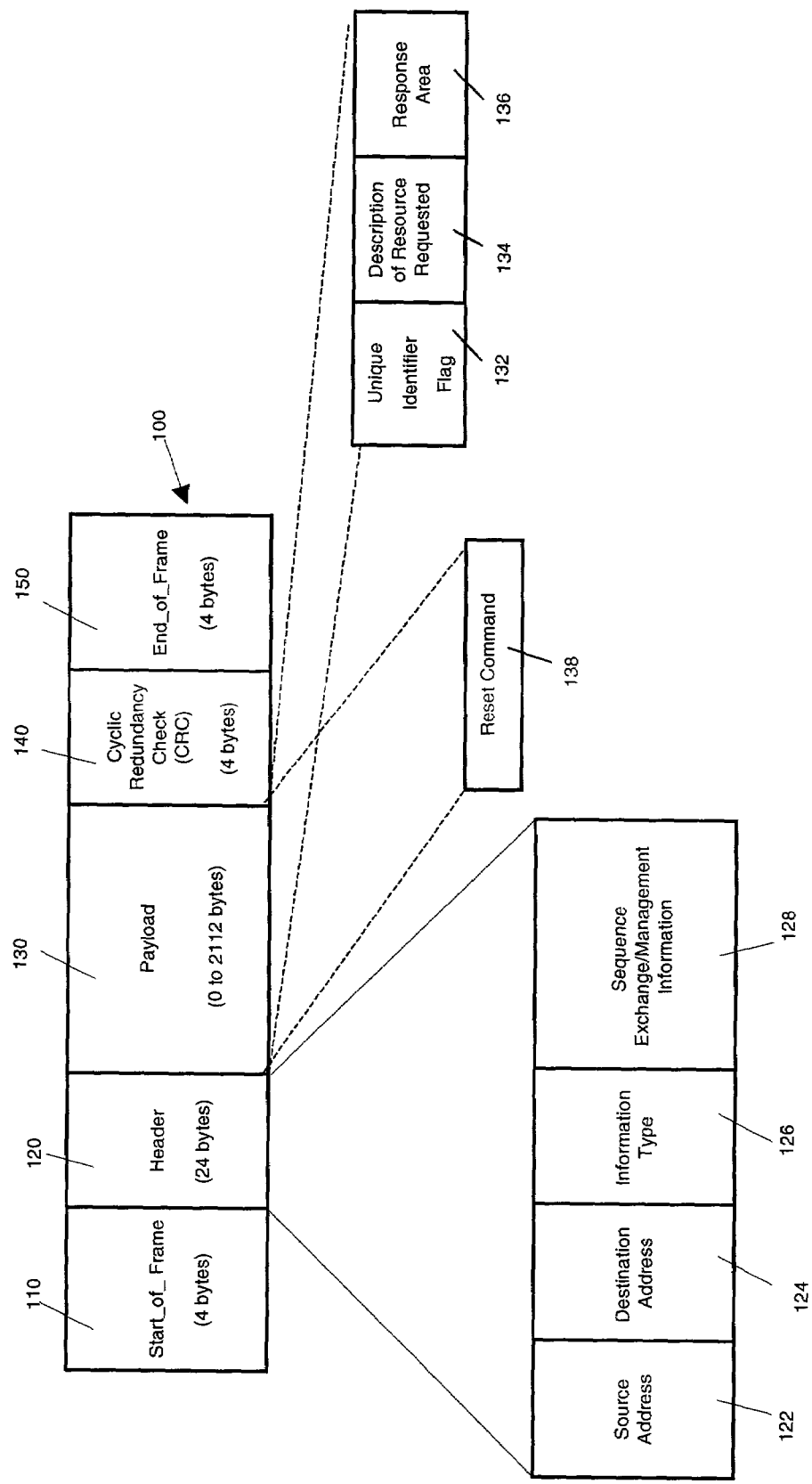
FIG. 4 is a block diagram of the components of a frame processed by the support device of FIG. 3.

Frame delimiters are one class of ordered set. A frame delimiter includes one of a Start_of_Frame (SOF) or an End_of_Frame (EOF). These ordered sets immediately precede or follow the contents of a frame, their purpose being to mark the beginning and end of frames which are the smallest indivisible packet of information transmitted between two devices connected to a FC-AL, FIG. 4. As well as a Start_of_Frame (SOF) ordered set (110) and an End_of_Frame (EOF) ordered set (150), each frame (100) comprises a header (120), a payload (130), and a Cyclic Redundancy Check (CRC) (140). The header (120) contains information about the frame, including:

routing information (the addresses of the source and destination devices (122 and 124) known as the source and destination ALPA respectively)

the type of information contained in the payload (126) and sequence exchange/management information (128).

The payload (130) contains the actual data to be transmitted and can be of variable length between the limits of 0 and 2112 bytes. The CRC (140) is a 4-byte record used for detecting bit errors in the frame when received.

Figure 5:
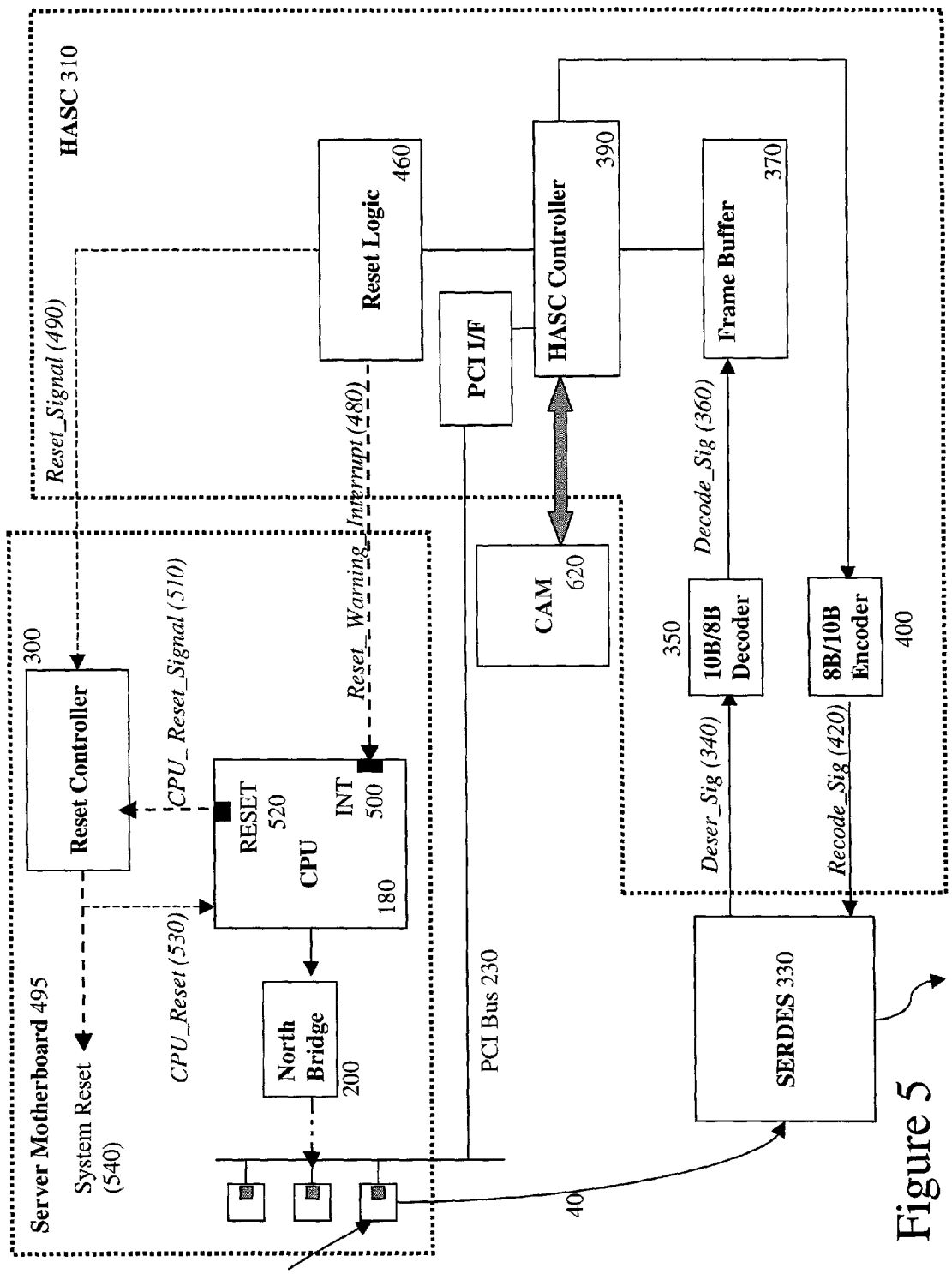
FIG. 5 is a more detailed block diagram showing the components and processes occurring in a server of FIG. 3.

FIG. 5 shows the processes occurring in Server B (30) on receipt of a frame from Server A (20) in more detail. The frame is transmitted to a Serialiser/Deserialiser (SERDES) (330) that samples and retimes the signal according to an internal clock that is phase-locked to the received serial data (further details can be obtained from Vitesse Data Sheet VSC7126).

The SERDES (330) deserialises the data into parallel data at $1/10^{th}$ or $1/20^{th}$ of the rate of the serial data and transmits the resulting data onto the 10-bit or 20-bit bus (Deser_Sig (340)). In the embodiment shown in FIG. 5 the SERDES (330) is shown as an external component, independent of the HASC (310) itself, but it should be recognised that it could equally be an integral component of the HASC (310).

The deserialised data (Deser_Sig (340)) is decoded by a block of 10B/8B decoders (350) in accordance with the inverse of the 8B/10B encoding scheme to convert the received 10 bit transmission characters into bytes (Decode_Sig (360)). In the embodiment depicted in FIG. 5, the 10B/8B decoder block (350) is shown as an internal component of the HASC (310) but it should be recognised that the decoding could have been performed in the SERDES (330) itself.

The unencoded data (Decode_sig (360)) is transmitted along an 8 bit bus to a frame buffer (370) which identifies from the unencoded data-stream, frames (100) transmitted between different devices connected to the FC-AL (40) and transmits the frames to the HASC controller (390).

In one aspect of the preferred embodiment, the HASC is employed to provide predictable reset operation and overcome the problem of resetting servers through the FC_AL. Using an associated HASC (310), one processor can interrogate and control the reset signals of another server, thus forcing it off the fibre channel loop if necessary. In this case, the payload (130) of a frame responsible for resetting a server includes a reset command (138), FIG. 4.

In another aspect of the embodiment, the payload (130) of a frame responsible for lock management is further divided into a unique identifier flag (132), a description of the resource requested (134) and a response area (136). In this case, the unique identifier flag (132) indicates that the frame (100) contains a lock request and thereby serves to differentiate the frame (100) from the rest of the traffic on the FC-AL (40). The description of the resource requested (134) section holds the name of the file (or block ID) for which the presence of locks is being searched. The response area (136) section of the payload (130) is where a server with a lock on the file listed in the description of resource requested (134) writes a message to indicate the same.

The HASC controller (390) checks the payload of a received frame for the presence of a reset command (138) or a lock management unique identifier flag (132). The HASC controller (390) further extracts from the frame header (120), the Arbitrated Loop Physical Addresses (ALPA) of the source and destination devices of the received frame (122, 124).

Reset Frames

A frame is identified as being a reset frame (i.e. for the purpose of resetting a server) if its payload (130) contains a reset command (138).

In this example, if the ALPA of the destination device of a reset frame (124), detected by the HASC controller (390) of Server B (30), does not match the ALPA of the HASC (310), it indicates that the frame has been sent from Server A (20) to reset a server other than Server B (30). In such case, the frame (100) is transmitted to an 8B/10B encoding block (400) which re-encodes every 8 bits of the data into 10 bit transmission characters (Recode_sig (420)). The resulting data is serialised by the SERDES (330) and transmitted it to the next device on the FC-AL (60).

However, if the ALPA of the destination device of a reset frame (124) does match the ALPA of the HASC (310) of server B (30), it indicates that Server A (20) has sent the frame with the intention of resetting Server B (30). In this case, the frame's reset command (138) activates a reset logic unit (460) of the HASC (310).

The reset logic unit (460) subsequently produces two signals, namely Reset_Warning (480) and Reset_Signal (490) which are both transmitted to the server's motherboard (495).

The Reset_Warning signal (480) is transmitted to an interrupt input (500) of the server CPU (180) and warns the server (30) that it is about to be reset so that it can gracefully shut-down any applications it might be running at the time. Once the server's applications are shut-down, the server's CPU (180) transmits its own CPU_Reset_Signal (510) from its reset output (520) to the server's reset controller (300) in order to activate the reset process.

Alternatively if it is necessary to shutdown the hung server immediately, a Reset_Signal (490) is sent directly from the reset logic unit (460) of the HASC (310) to the server reset controller (300). The reset controller (300) then sends a reset signal to the CPU (CPU_Reset (530)) and issues system resets (540).

The system resets (540) are shown more clearly in FIG. 3 which shows the relationships between the HASC (310) and the rest of the server (30) and SAN (10) components. The system resets (540) comprise an FC/PCI_Reset (550) to the FC/PCI chip (220), a Network_Link_Reset (560) to the network adaptor (160) and a NB Reset (580) to the North Bridge (200).

The reset procedure operates in two modes, namely reset and release and reset and hold. The reset and release mode is typically used in high availability systems and is implemented by transmitting the CPU_Reset (530) and system reset (540) signals for a period and then terminating that transmission (i.e. releasing the reset server to continue functioning as normal). The status of the reset server is monitored by its buddy to determine whether it is functioning properly after the reset operation (i.e. to determine whether the reset operation has remedied the fault in the server).

In the reset and hold mode it is assumed that it is not possible to remedy the error in the faulty server by simply resetting it, or in other words that the server would not function properly after a reset had been terminated. Consequently the transmission of the CPU reset (530) and system resets (540) to the errant server are continued until the server can be replaced.

So far the discussions of fault detection and server resetting by the buddy system have described the situation where only one of the devices in the buddy pair was faulty at a given point in time. However if both servers in the buddy pair were to fail at the same time, there is a risk that the two servers would reset each other simultaneously. In order to prevent such occurrence, one of the servers in a buddy pair is designated the master with a watchdog timeout of shorter duration than that of the other server.

In the embodiment described above the servers engage in load-balancing during normal operation and can buddy up with a spare, if available, if it loses its own buddy. Whilst the embodiment is described with reference to a two server buddy system, it should be recognised that the invention is not limited in respect of the number of servers which can reset each other.

In any case, it will be seen that the HASC can operate in Reset mode without any software configuration or support, and as such is independent of the server logic.

Lock Management Frame

A frame is identified as being for the purpose of lock management if its payload (130) contains a lock management unique identifier flag (132). If the ALPA of the destination device of a lock management frame (124) matches the ALPA of the HASC (310) (of server B (30) in this example), it indicates that Server A (20) (in this example) has sent the frame to check whether or not Server B (30) has a lock on the file identified in the description of resource requested section (134) of its payload (130). In general, however, the originator of a lock management frame would simply send the frame to itself, ensuring that the frame would travel all around the loop. In this regard it should be noted that either the server, via its own FC-AL port can issue the lock management frame, or it can delegate this task to its associated HASC. In the former case, a lock management frame will terminate at the server FC-AL port with the processor then indicating to the HASC if it has obtained a lock or not, while in the latter, the HASC notifies the associated processor if a lock has been obtained or not.

Prior to transmitting the frame, Server A (20) via its HASC (310) first checks its own CAM (620) to determine whether or not it already had a lock on the file by a concurrently running process based on a previous request for the same file from another client workstation (60). If Server A (20) determines that it does already have a lock on the file, the client workstation requesting access to the file will have to wait until the process accessing the file, relinquishes its locks thereon. It is only if Server A (20) determines that it does not already have a lock on the file that it transmits a lock management frame to the other devices on the FC-AL.

The frame transmitted by Server A (20) includes Server A's (20) own ALPA as its frame destination ALPA (124). When the frame is identified by the HASC controller (390) of Server B (30) as a lock management frame from another server, the HASC controller (390) extracts the filename (or the block ID) from the description of resource requested (134) section of the frame. The HASC controller (390) then transmits the filename (or block ID) to the CAM (620), which causes the CAM (620) to search its records for the presence of the relevant filename (or block ID). The presence of the corresponding file entry in the CAM (620) indicates that Server B (30) has a lock on the file of interest. (As described later, it can also indicate if Server B wants to lock the file of interest.)

The results of the CAM (620) search are transmitted back to the HASC controller (390). If the search results indicate that the server has a lock on the file in question, the HASC controller (390) will make an entry in the response area (136) of the frame's payload (130) to that effect. However if the search results indicate that the server does not have a lock on the file in question, the frame is not amended.

The HASC controller (390) returns the resulting frame to an 8B/10B encoding block (400) for re-encoding and subsequent serialisation by the SERDES (330) as described above. The resulting frame is then transmitted onto the FC-AL (40) to the next device connected thereto. The 8B/10B encoding blocks (400) re-encode every 8 bits of the data into 10 bit transmission characters (Recode_Sig (420)) to be parallelised by the SERDES (330) and transmitted to the next device on the FC-AL (40).

However, if the destination ALPA (124) of the received lock management frame (100) matches the server's own ALPA, this indicates that the frame has done a full circle of the FC-AL (40) and has returned to its originator (Server A (20) in this example) having stimulated each server on the FC-AL (40) in turn to conduct a search of its CAM (620) and to amend the frame accordingly.

If on receiving the frame, the originator of the lock management frame does not find any entries in the response area (136) of the frame (100), then this indicates that the file in question does not have any locks on it by the other servers on the FC-AL (40). In this case, the server accesses the file and the server's HASC controller (390) causes the CAM (620) to write a lock for the file to its own records, thereby preventing other servers on the FC-AL (40) from accessing the file.

Since it is necessary for Server A (20) to query every server on the FC-AL for the presence of a lock before placing its own lock on the file, Server A (20) makes an additional provisional entry to its own CAM before transmitting its lock management frame to prevent any of the other servers on the FC-AL from putting a lock on the file (or in other words, changing its lock status) whilst Server A (20) is querying the rest of the servers on the FC-AL.

This can cause two servers seeking to lock the same file to at the same time provisionally lock the file in their own CAMs before discovering another server has provisionally locked the file. There are many ways to resolve such a scenario, for example, both servers could then release their provisional lock and re-try a random period afterwards to resolve access to the file.

The description of the embodiment has so far focussed on the lock management functionality in isolation. However as has already been stated, the buddy system for identifying and resetting hung servers is particularly important in file-sharing systems since a given server that fails could leave its locks in place indefinitely. However, the process of resetting a faulty server also clears its locks. Hence, it is necessary for each server in a buddy pair to retain a record of its buddy's locks in order to restore its buddy to the condition it had been (in respect of its locks) prior to a reset operation, if the buddy hangs. Consequently, a server's CAM must have sufficient capacity to hold both its own locks and those of its buddy.

When a server is finished using a file it must remove its locks on the file to enable other servers on the FC-AL (40) to access the file. This is achieved by clearing the relevant filename from its CAM (620). But since a server keeps a copy of its buddy's locks it is also necessary for the server wishing to clear a filename from its CAM (620), to do so to the copy of its locks in its buddy's CAM (620). If the CAM (620) has filled with lock records it will not permit further lock management traffic on the FC-AL until some of its locks (or those of its buddy) have cleared.

Further, if a server determines that it has a lock on a file it could additionally append to its tag on the lock management frame, its ALPA and/or, the time at which it had locked the frame. Such data would enable a server to check the activity on a lock and if the lock has remained unchanged over an extended period, inferring that the locking server had hung.

It should also be noted that FC-AL devices support dual loop modes of operation, enhancing fault-tolerance by allowing redundant configurations to be implemented. The dual loop system also offers the potential of increasing throughput of the SAN by sending commands to a device over one loop whilst transferring data over the other loop and this again has importance for file sharing systems.

Figure 6:
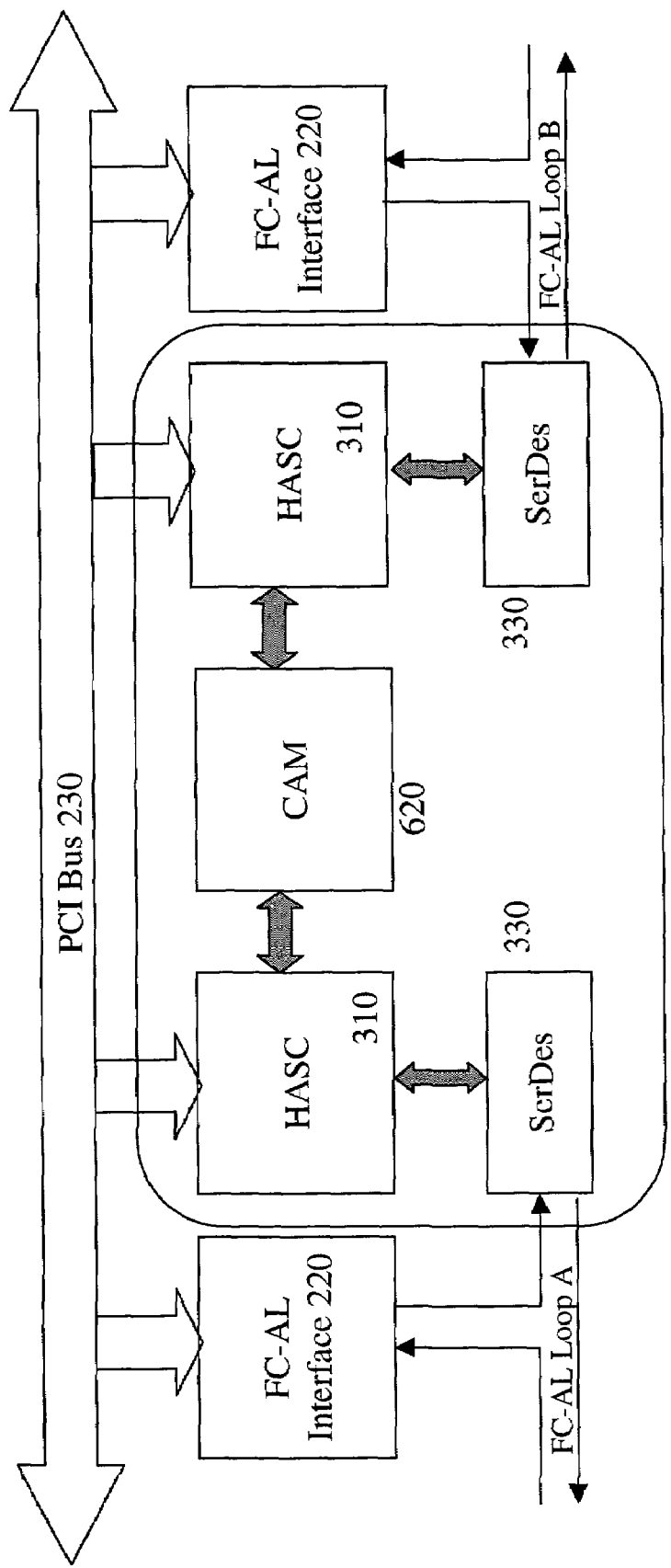
FIG. 6 is a block diagram showing a dual loop embodiment of the invention.

FIG. 6 shows the relevant details of a server supporting such duplex operation so that the server can receive data from either FC-AL loop A and/or FC-AL loop B, wherein each loop could also be connected to different devices. The server has two separate PCI connected HASCs (310) and SERDES (330) for each loop, with each HASC (310) being in communication with a common content addressable memory (CAM) (620) for the purposes of maintaining file locks in the file sharing system. In this case, if the HASC were produced as an integrated unit, it would appear simply as having two FC-AL ports, one for each FC loop.

What is claimed is:

1. A processor resetting apparatus comprising:
   a fibre channel arbitrated loop (FC-AL) interface arranged to receive a frame addressed to the particular interface and containing an indicator of a reset command for a server including a processor associated with said resetting apparatus; and
   a reset controller external to and distinct from the processor, responsive to said reset command, to issue a hardware reset interrupt command for resetting said processor.

2. A method for use with a system comprising first and second servers communicatively coupled over a fibre channel arbitrated loop (FC-AL) communications channel, each server comprising an FC-AL interfiace coupled to the FC-AL communications channel, and arranged to receive a frame containing an indicator of a reset command for a server including a processor associated with said resetting apparatus; and a reset controller, responsive to said reset command, to issue a reset interrupt command for resetting said processor; the method comprising the steps of:
   at the first server, sending a frame over the FC-AL communications channel containing an indicator of a reset command addressed to the second server,
   at the second server, receiving within a reset controller external to and distinct from the processor of the second servers the frame over the FC-AL communications channel containing the indicator of the reset command adddressed to the second server;
   at the second server, in response to the receipt of the frame containing the indicator of the reset command, issuing a hardware reset interrupt command from the reset controller to the processor of the second server;
   whereby the processor of the second server is reset by means of the hardware reset interrupt command.

* * * * *